US010471790B2

(12) United States Patent
Meyer

(10) Patent No.: US 10,471,790 B2
(45) Date of Patent: Nov. 12, 2019

(54) CONTROL ARM FOR THE WHEEL SUSPENSION IN A VEHICLE

(71) Applicant: Benteler Automobiltechnik GmbH, Paderborn (DE)

(72) Inventor: Stephan Meyer, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 90 days.

(21) Appl. No.: 15/829,348

(22) Filed: Dec. 1, 2017

(65) Prior Publication Data

US 2018/0154721 A1 Jun. 7, 2018

(30) Foreign Application Priority Data

Dec. 5, 2016 (DE) .......................... 10 2016 123 499

(51) Int. Cl.
*B60G 7/00* (2006.01)

(52) U.S. Cl.
CPC ........ *B60G 7/001* (2013.01); *B60G 2206/012* (2013.01); *B60G 2206/017* (2013.01); *B60G 2206/14* (2013.01); *B60G 2206/7102* (2013.01); *B60G 2206/81* (2013.01); *B60G 2206/82092* (2013.01)

(58) Field of Classification Search
CPC ..................................................... B60G 7/001
See application file for complete search history.

(56) References Cited

U.S. PATENT DOCUMENTS

| | | | | | |
|---|---|---|---|---|---|
| 4,480,498 | A | * | 11/1984 | Konig | B60G 7/001 74/579 R |
| 5,163,603 | A | * | 11/1992 | Richart | B60G 7/001 228/141.1 |
| 5,310,210 | A | * | 5/1994 | Delbeke | B60G 7/001 280/124.134 |
| 5,607,177 | A | * | 3/1997 | Kato | B60G 3/06 188/377 |
| 6,241,267 | B1 | * | 6/2001 | Dziadosz | B60G 3/28 280/124.134 |
| 7,506,444 | B2 | * | 3/2009 | Weise | B60G 7/001 29/557 |
| 8,291,595 | B2 | * | 10/2012 | Runte | B21D 53/88 29/897.2 |

(Continued)

FOREIGN PATENT DOCUMENTS

| | | | |
|---|---|---|---|
| DE | 19526562 A1 * | 2/1996 | ............... B21D 9/15 |
| DE | 10 2008 015 393 A1 | 9/2009 | |

(Continued)

*Primary Examiner* — Nicole T Verley
(74) *Attorney, Agent, or Firm* — Holland & Hart LLP

(57) ABSTRACT

The disclosure relates to a control arm for a wheel suspension system in a vehicle, including a sleeve-shaped aperture for the receiving of a bearing is formed in an integral control arm body, wherein the integral control arm body comprises a first side wall and a second side wall that is facing the first side wall. The sleeve-shaped aperture penetrates the first side wall and the second side wall. The sleeve-shaped aperture is formed sleeve-shaped with a first circumferential sleeve rim and a second circumferential sleeve rim. The first sleeve rim is formed by an outwardly shaped section of the first side wall that defines the sleeve-shaped aperture.

18 Claims, 3 Drawing Sheets

(56) References Cited

U.S. PATENT DOCUMENTS

| | | | | |
|---|---|---|---|---|
| 8,322,738 | B2* | 12/2012 | Haas | B60G 7/001 |
| | | | | 280/124.128 |
| 8,414,003 | B2* | 4/2013 | Yu | B60G 7/001 |
| | | | | 280/124.134 |
| 8,757,649 | B2* | 6/2014 | Erdogan | B60G 7/001 |
| | | | | 280/124.128 |
| 9,090,138 | B2* | 7/2015 | Haselhorst | B60G 7/001 |
| 9,193,237 | B2* | 11/2015 | Hudler | B60G 7/001 |
| 9,233,587 | B2* | 1/2016 | Korte | B21D 53/90 |
| 9,463,677 | B2* | 10/2016 | Czerr | B60G 3/202 |
| 9,956,838 | B2* | 5/2018 | Mosteiro Goyoaga | |
| | | | | B60G 7/001 |
| 2005/0258613 | A1* | 11/2005 | Kleckner | B60G 7/001 |
| | | | | 280/124.107 |
| 2014/0361507 | A1* | 12/2014 | Park | B60G 7/001 |
| | | | | 280/124.134 |
| 2015/0008654 | A1* | 1/2015 | Haselhorst | B60G 7/001 |
| | | | | 280/124.128 |
| 2017/0001489 | A1* | 1/2017 | Mosteiro Goyoaga | |
| | | | | B23P 15/00 |

FOREIGN PATENT DOCUMENTS

| | | | | |
|---|---|---|---|---|
| DE | 102008013182 A1 * | 9/2009 | | B60G 7/001 |
| DE | 10 2011 052 398 A1 | 2/2013 | | |
| DE | 102011052398 A1 * | 2/2013 | | B60G 7/001 |
| DE | 102011080452 A1 * | 2/2013 | | B60G 7/001 |
| DE | 102013003145 A1 * | 8/2014 | | B60G 7/001 |
| EP | 2671741 A1 * | 12/2013 | | B21D 53/90 |
| EP | 3192680 A1 * | 7/2017 | | B60G 7/001 |
| WO | WO-2012124734 A1 * | 9/2012 | | B60G 7/001 |

* cited by examiner

CONTROL ARM FOR THE WHEEL SUSPENSION IN A VEHICLE

CROSS-REFERENCE TO RELATED APPLICATIONS

This application claims priority to German patent application No. 10 2016 123 499.0, entitled "Radlenker für eine Radaufhängung in einem Fahrzeug", and filed on Dec. 5, 2016 by the assignee of this application, the entire disclosure of which is incorporated by reference for all purposes.

BACKGROUND

The present disclosure relates to a control arm for the wheel suspension in a vehicle, especially a motor vehicle.

As a control arm in an arrangement of chassis elements, for example, a wheel suspension, of a vehicle, sheet metal control arms, elastomeric hybrid control arms or aluminum control arms can be used in extrusion-molded or extruded form. A control arm is typically implemented by a control arm body with at least one sleeve-shaped aperture at one end of the control arm body for receiving a bearing, for example, an undercarriage bearing. In addition, a control arm can also have a recess in the middle region of the connecting element, which can be provided with a reinforcing structure. The bearing seat can be realized by an aperture in the control arm body, whereby an additional sleeve can also be introduced into the bearing seat. Typically, a bearing seat is formed on both control arm ends.

It is the object of the present disclosure to provide a more efficient form of a control arm for the force transmission in an undercarriage of a vehicle, preferably in the rear axle, and the bearing seat, in particular by reducing the weight of a control arm, increasing the torsional stiffness of a control arm, and reducing tool costs for the manufacture of a control arm.

SUMMARY

This object is achieved by the features of the independent claims. Advantageous examples are the subject matter of the dependent claims, the description as well as the accompanying figures.

The disclosure is based on the finding that the above object can be achieved by a control arm, which bearing seat is implemented as a sleeve-shaped aperture, wherein the sleeve-shaped aperture especially comprises two circumferential sleeve rims. These sleeve rims protrude out of the side wall of the control arm body as collars and provide an enlarged area for the receiving of a bearing. Thereby, the size of the bearing receiving face is indirect proportional to the losses of the force transmission in the undercarriage.

According to a first aspect the disclosure relates to a Control arm for a wheel suspension system in a vehicle, comprising: an integral control arm body in which a sleeve-shaped aperture for the receiving of a bearing is formed, wherein the integral control arm body comprises a first side wall and a second side wall which is facing the first side wall wherein the sleeve-shaped aperture penetrates the first side wall and the second side wall, wherein the sleeve-shaped aperture is formed sleeve-shaped with a first circumferential sleeve rim and a second circumferential sleeve rim, wherein the first sleeve rim is formed by an outwardly shaped section of the first side wall, which defines the sleeve-shaped aperture.

The hollow chamber profile increases the torsion stiffness of the control arm.

The circumferential sleeve rims enlarge the receiving area between the control arm and the bearing in a collar shaped manner, so that the force transmission between the bearing and the control arm is increased. The form-fitting integral production of the control arm enables a production with reduced and/or scalable wall thickness, so that the total weight of the control arm can be reduced compared with conventional production methods. Additionally, the insertion of an additional sleeve for the keeping of the bearing can be omitted.

In an advantageous example of the control arm the first sleeve rim protrudes out of the first side wall as a circumferential collar.

Through forming the collar at the side walls of the integral control arm body a large enough receiving area for the reception of a bearing can be provided. Thereby, the control arm can be produced with a reduced wall thickness and the insertion of an additional sleeve for the receiving of the bearing can be omitted. In comparison to known examples this results in a weight reduction and reduction of the production costs of a control arm.

In an advantageous example of the control arm the second sleeve rim ends flush with the second side wall or wherein the second sleeve rim is formed by an outwardly shaped section of the second side wall, which defines the sleeve-shaped aperture.

In an advantageous example the first sleeve rim protrudes out of the first side wall as a circumferential collar.

In an advantageous example of the control arm the first sleeve rim and the second sleeve rim are each formed by a plastically deformed expanded section of the respective side wall, which defines the respective sleeve-shaped aperture.

In an advantageous example of the control arm the integral control arm body is formed by an integral hollow chamber profile.

In an advantageous example of the control arm a first longitudinal bead is formed in the first side wall, wherein a second longitudinal bead is formed in the second side wall, wherein the first longitudinal bead and the second longitudinal bead extend in a longitudinal direction of the integral control arm body and protrude into the interior of the integral control arm body.

In an advantageous example of the control arm the first longitudinal bead is formed by a deformation of the first side wall, and wherein the second longitudinal bead is formed by a deformation of the second side wall.

In an advantageous example of the control arm the first longitudinal bead and the second longitudinal bead are spaced apart from one another.

The torsion stiffness of the control arm is increased by the longitudinal beads, which extend in a longitudinal direction of the integral control arm body and protrude into the interior of the integral control arm body. In this way a control arm body can be realized advantageously.

In an advantageous example of the control arm the integral control arm body comprises a control arm end in which a sleeve-shaped aperture is formed, wherein the control arm end comprises a first leg and a second leg which are spaced apart from one another.

In an advantageous example of the control arm the first side wall is formed by the first leg, and wherein the second side wall is formed by the second leg.

In an advantageous example of the control arm the control arm end is bulged. Thereby, the receiving area for the receiving of a bearing can be enlarged advantageously.

In an advantageous example of the control arm the first side wall comprises a third circumferential sleeve rim, which faces away from the first circumferential sleeve rim and is formed by an outwardly shaped section of the first side wall, which defines the sleeve-shaped aperture.

In an advantageous example of the control arm the first side wall comprises a third circumferential sleeve rim, which faces away from the first circumferential sleeve rim and is formed by an outwardly shaped section of the first side wall, which defines the sleeve-shaped aperture, and wherein the second side wall comprises a fourth circumferential sleeve rim, which faces away from the second circumferential sleeve rim and is formed by an outwardly shaped section of the second side wall, which defines the sleeve-shaped aperture.

In an advantageous example the disclosure relates to a control arm comprising: a sleeveless bearing, which is disposed in the sleeve-shaped aperture, wherein the sleeve-shaped aperture forms or replaces a sleeve of the bearing.

According to a second aspect the invention relates to a method for producing a control arm for a wheel suspension in a vehicle, comprising: providing an integral control arm body, especially a hollow chamber profile, comprising a control arm end, a first side wall and a second side wall; producing an opening in the control arm end; mechanically expanding the opening, wherein a section of the first side wall, which defines the opening is deformed outwardly during the expanding to receive a sleeve-shaped aperture with a first circumferential sleeve rim and with a second circumferential sleeve rim for the reception of a bearing.

The expanding of the opening may, for example, be achieved by a roller-burnishing process. Advantageous for the molding of the circumferential sleeve rims at the openings is the use of an aluminum alloy, for example from the group 5xxx or 6xxxx as a starting material for the production of the control arm. Furthermore, it is possible to scale the wall thickness of a control arm from the described production method.

In an advantageous example the expanding of the opening is realized by non-cutting compressive forming.

BRIEF DESCRIPTION OF THE DRAWINGS

Examples of the principles of this disclosure are explained in more detail with reference to the appended drawings.

DETAILED DESCRIPTION OF THE DRAWINGS

Figure 1:
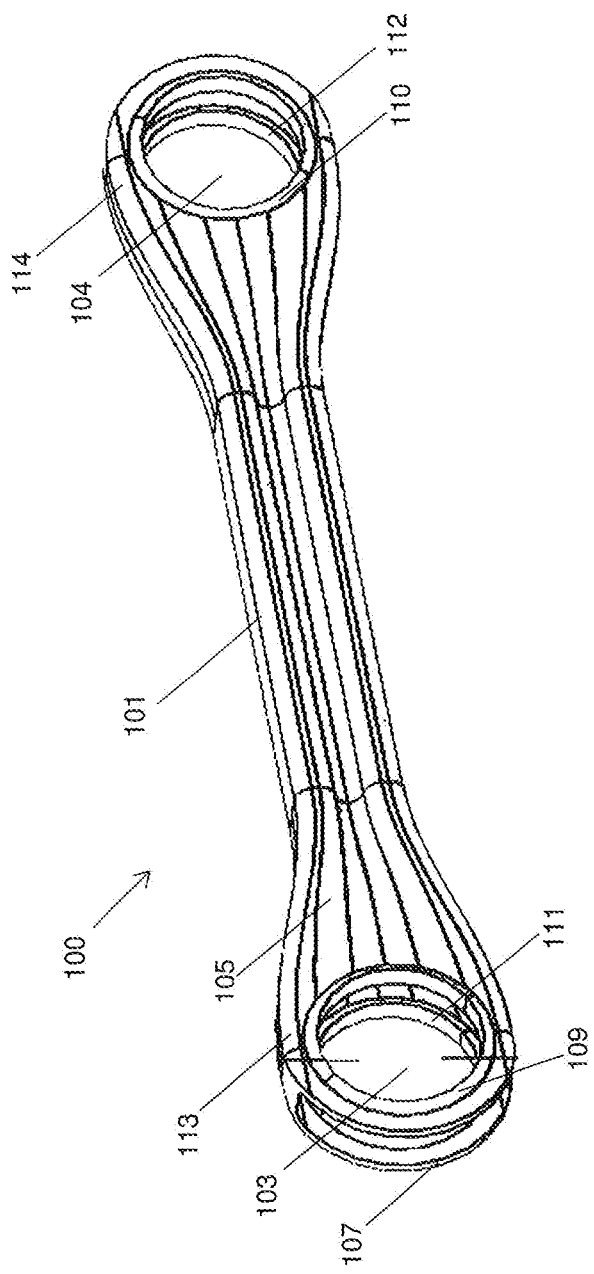
FIG. 1 shows a control arm according to an example.

FIG. 1 depicts a schematic representation of a control arm 100 comprising an integral control arm body 101 at the control arm ends 113 and 114 of which a sleeve-shaped aperture 103, 104 for the reception of a bearing is formed. Furthermore, the integral control arm body 101 comprises a first side wall 105 and a second side wall 107, wherein the sleeve-shaped apertures 103 and 104 penetrate the first side wall 105 and the second side wall 107. The sleeve-shaped apertures 103 and 104 are formed with a first circumferential sleeve rim 109 (110) and a second circumferential sleeve rim 111 (112), wherein the first sleeve rim 109 (110) is formed by an outwardly shaped section of the first side wall 105, which defines the sleeve-shaped aperture 103 (104).

In an advantageous example the control arm body 101 is formed by extrusion.

In an advantageous example the control arm 100 is realized as a straight or bend two point control arm as part of a wheel suspension.

Figure 2:
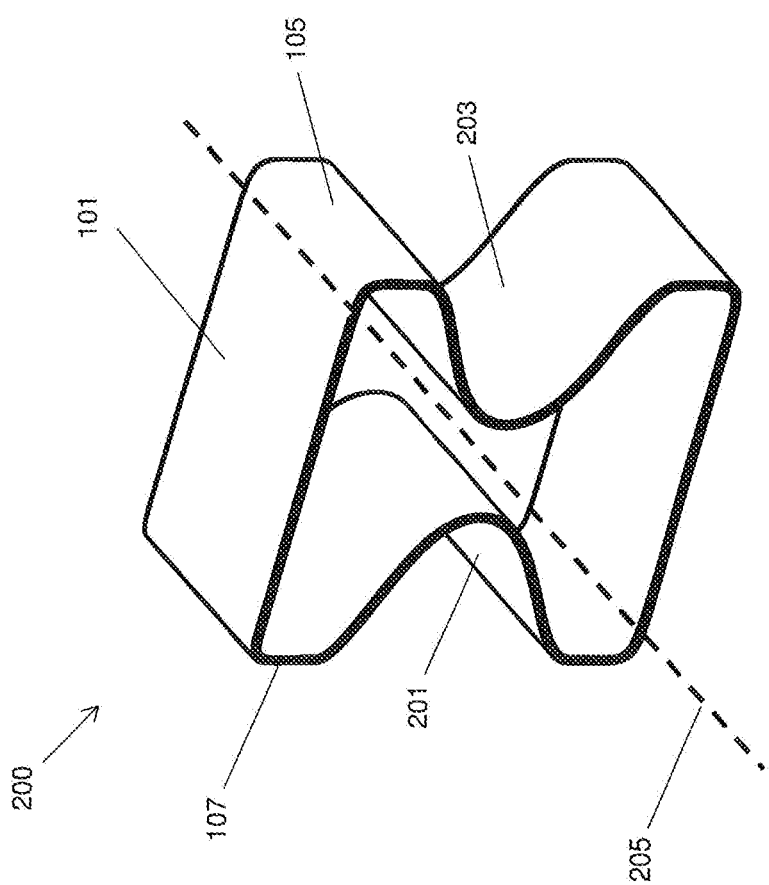
FIG. 2 shows an extruded hollow chamber profile according to an example.

FIG. 2 depicts a schematic representation of an extruded hollow chamber profile 101 of a control arm 100, wherein a first longitudinal bead 201 is formed in the first side wall 105 and a second longitudinal bead 203 is formed in the second side wall 107. The first longitudinal bead 201 and the second longitudinal bead 203 extend in a longitudinal direction 205 of the integral control arm body 101 and protrude into the interior of the integral control arm body 101. The first longitudinal beads 201 and 203 are formed by a deformation of the respective side wall 105 respectively 107 and comprise a distance from one another, so that the longitudinal beads 201 and 203 do not overlap.

In an advantageous example the extruded hollow chamber profile 200 of the integral control arm body 101 can be formed during a pressing process. The profile formed in this way has a higher torsional stiffness compared to known examples.

In an advantageous example the extruded hollow chamber profile 200 can deviate from the rectangular base form by having rounded corners.

In an advantageous example the extruded hollow chamber profile of the integral control arm body 101 remains unchanged over the entire length of the integral control arm body 101 along the longitudinal axis 205 to the control arm ends 113 and 114.

In an advantageous example the transition between the extruded hollow chamber profile 200 with the longitudinal beads 201 and 203 and the control arm ends 113 and 114 is realized in a form-fitting manner.

In an advantageous example the longitudinal beads 201 and 203 are formed along the same direction as the apertures 103 and 104.

Figure 3:
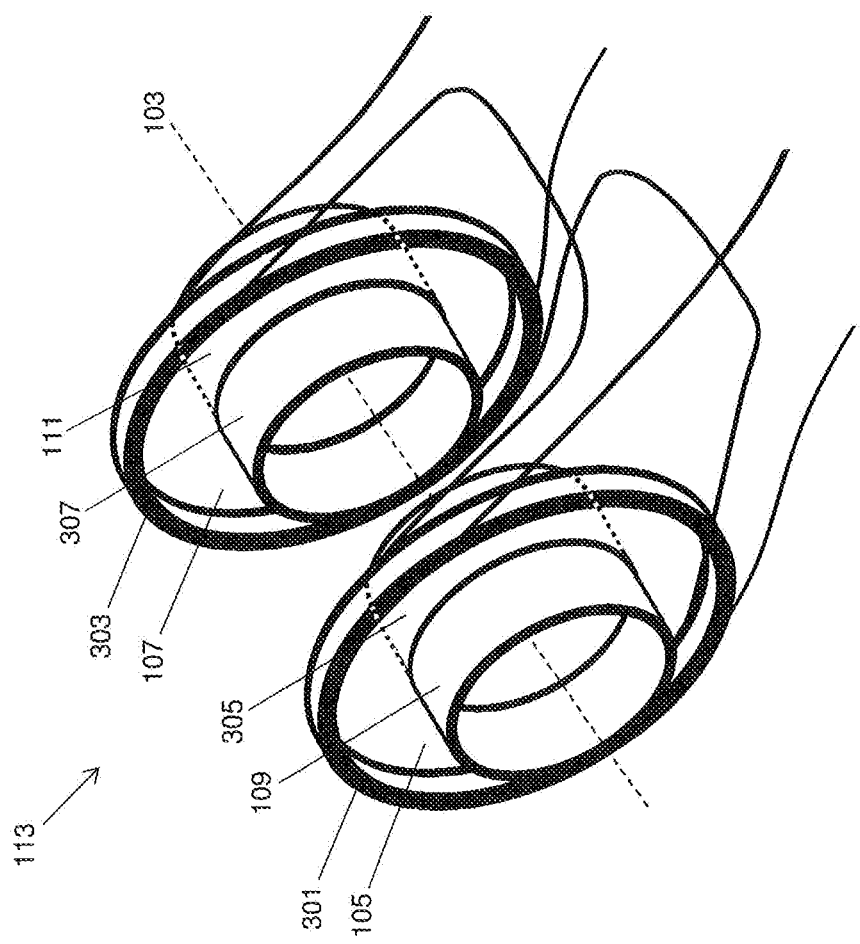
FIG. 3 shows a view of the control arm base according to an example.

FIG. 3 depicts a schematic representation of a control arm end 113, wherein the first side wall 105 comprises a third circumferential sleeve rim 305, which faces away from the first circumferential sleeve rim 109 and is formed by an outwardly shaped section of the first side wall 105, which defines the sleeve-shaped aperture 103. The second side wall 107 comprises a fourth circumferential sleeve rim 307, which faces away from the second circumferential sleeve rim 111 and is formed by an outwardly shaped section of the second side wall 107, which defines the sleeve-shaped aperture 103.

In an advantageous example the control arm ends 113 and 114 of a control arm 100 are formed circularly.

In an advantageous example the control arm ends 113 and 114 of a control arm 100 are connected to each other on the connecting side with the integral control arm body 101 only by part of the circumference of the side walls 105 and 107.

In an advantageous example the circumferential sleeve rims 109, 110, 111, 112, 305 and 307 are formed by an incremental roller-burnishing process of the sleeve-shaped apertures 103 and 104 and so the bearing surface for the bearing is enlarged. The diameter of the control arm ends 113 and 14 can be enlarged especially bulged by roller burnishing.

In an advantageous example the circumferential sleeve rims have a profile, which has a lower thickness with increasing distance from the side walls 105 or 107.

In an advantageous example the openings, which are formed into the apertures are designed circular, especially oval.

REFERENCE NUMBER LIST

100 Control arm
101 Integral control arm body
103 Sleeve-shaped aperture
104 Sleeve-shaped aperture
105 First side wall
107 Second side wall
109 First circumferential sleeve rim at control arm end 113
110 First circumferential sleeve rim at control arm end 114
111 Second circumferential sleeve rim at control arm end 113
112 Second circumferential sleeve rim at control arm end 114
113 Control arm end
114 Control arm end
200 Extruded hollow chamber profile
201 First longitudinal bead
203 Second longitudinal bead
205 Longitudinal direction
301 First leg
303 Second leg
305 Third circumferential sleeve rim
307 Fourth circumferential sleeve rim

What is claimed is:

1. A control arm for a wheel suspension system in a vehicle, comprising:
a sleeve-shaped aperture for the receiving of a bearing formed in an integral control arm body, wherein the integral control arm body comprises:
a first side wall,
a second side wall that faces the first side wall, and
a control arm end, wherein the control arm end comprises a first leg and a second leg that are spaced apart from one another,
wherein the sleeve-shaped aperture penetrates the first side wall and the second side wall, wherein the sleeve-shaped aperture is formed sleeve-shaped with a first circumferential sleeve rim and a second circumferential sleeve rim, wherein the first circumferential sleeve rim is formed by an outwardly shaped section of the first side wall that defines the sleeve-shaped aperture, wherein the first aide wall comprises a third circumferential sleeve rim that faces away from the first circumferential sleeve rim and is formed by an outwardly shaped section of the first side wall that defines the sleeve-shaped aperture, and wherein the sleeve-shaped aperture is formed in the control arm end.

2. The control arm according to claim 1, wherein the first circumferential sleeve rim protrudes out of the first side wall as a circumferential collar.

3. The control arm according to claim 1, wherein the second circumferential sleeve rim ends at the second side wall.

4. The control arm according to claim 1, wherein the second circumferential sleeve rim is formed by an outwardly shaped section of the second side wall that defines the sleeve-shaped aperture.

5. The control arm according to claim 3, wherein the first circumferential sleeve rim protrudes out of the first side wall as a circumferential collar.

6. The control arm according to claim 1, wherein the first circumferential sleeve rim and the second circumferential sleeve rim are each formed by a plastically deformed expanded section of the respective side wall that defines the respective sleeve-shaped aperture.

7. The control arm according to claim 1, wherein the integral control arm body is formed by an integral hollow chamber profile.

8. The control arm according to claim 1, wherein a first longitudinal bead is formed in the first side wall, wherein a second longitudinal bead is formed in the second side wall, wherein the first longitudinal bead and the second longitudinal bead extend in a longitudinal direction of the integral control arm body and protrude into an interior of the integral control arm body.

9. The control arm according to claim 8, wherein the first longitudinal bead is formed by a deformation of the first side wall, and wherein the second longitudinal bead is formed by a deformation of the second side wall.

10. The control arm according to claim 8, wherein the first longitudinal bead and the second longitudinal bead are spaced apart from one another.

11. The control arm according to claim 1, wherein the first side wall is formed by the first leg, and wherein the second side wall is formed by the second leg.

12. The control arm according to claim 11, wherein the control arm end is bulged.

13. The control according to claim 1, wherein the first side wall comprises a third circumferential sleeve rim that faces away from the first circumferential sleeve rim and is formed by an outwardly shaped section of the first side wall that defines the sleeve-shaped aperture, and wherein the second side wall comprises a fourth circumferential sleeve rim that faces away from the second circumferential sleeve rim and is formed by an outwardly shaped section of the second side wall that defines the sleeve-shaped aperture.

14. The control arm according to claim 1, comprising:
a sleeveless bearing that is disposed in the sleeve-shaped aperture, wherein the sleeve-shaped aperture forms or replaces a sleeve of the sleeveless bearing.

15. A method for producing a control arm for a wheel suspension in a vehicle, comprising:
providing an integral control arm body comprising a control arm end, a first side wall, and a second side wall, wherein the control arm end comprises a first leg and a second leg that are spaced apart from one another;
producing an opening in the control arm end;
mechanically expanding the opening, wherein a section of the first side wall that defines the opening is adapted to receive a sleeve-shaped aperture with a first circumferential sleeve rim and with a second circumferential sleeve rim for the reception of a bearing, wherein the sleeve-shaped aperture is formed in the control arm end, and wherein the first side wall comprises a third circumferential sleeve rim that faces away from the first circumferential sleeve rim and is formed by an outwardly shaped section of the first side wall that defines the sleeve-shaped aperture.

16. The method for producing a control arm according to claim 15, wherein the integral control arm body comprises a hollow chamber profile.

17. The method for producing a control arm according to claim 15, further comprising:
deforming an expanded section of the first side wall to form the first circumferential sleeve rim.

18. The method for producing a control arm according to claim 15, further comprising:
forming a first longitudinal bead in the first side wall, and forming a second longitudinal bead in the second side wall, wherein the first longitudinal bead and the second longitudinal bead extend in a longitudinal direction of the integral control arm body and protrude into an interior of the integral control arm body.

\* \* \* \* \*